US009396184B2

(12) United States Patent
Roy et al.

(10) Patent No.: US 9,396,184 B2
(45) Date of Patent: Jul. 19, 2016

(54) METHOD FOR TRANSLATING DOCUMENTS USING CROWDSOURCING AND LATTICE-BASED STRING ALIGNMENT TECHNIQUE

(75) Inventors: Shourya Roy, Bangalore (IN); Julien Bourdaillet, Rochester, NY (US); Gueyoung Jung, Rochester, NY (US); Yu An Sun, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 127 days.

(21) Appl. No.: 13/563,807

(22) Filed: Aug. 1, 2012

(65) Prior Publication Data

US 2014/0039870 A1    Feb. 6, 2014

(51) Int. Cl.
*G06F 17/28* (2006.01)
*G06Q 20/02* (2012.01)
*G06F 17/21* (2006.01)

(52) U.S. Cl.
CPC .................................. *G06F 17/2854* (2013.01)

(58) Field of Classification Search
CPC ..... G06F 17/2854; G06F 17/28; G06F 30/02; G06F 17/21; G06Q 30/02
USPC ........................................................ 704/1–9
See application file for complete search history.

(56) References Cited

U.S. PATENT DOCUMENTS

| 6,161,082 | A * | 12/2000 | Goldberg | G06F 17/289 704/3 |
| 6,950,501 | B1 * | 9/2005 | Chaturvedi | H04L 12/66 379/52 |
| 8,271,260 | B2 * | 9/2012 | Wong | G06F 17/28 704/2 |
| 8,996,353 | B2 * | 3/2015 | Orsini | G06F 17/289 704/10 |
| 8,996,355 | B2 * | 3/2015 | Orsini | G06F 17/289 704/2 |
| 2013/0185138 | A1 * | 7/2013 | Roy | G06Q 30/02 705/14.35 |
| 2014/0058718 | A1 * | 2/2014 | Kunchukuttan | G06F 17/2836 704/2 |

OTHER PUBLICATIONS

Bangalore et al., "Computing Consensus Translation from Multiple Machine Translation System", 2001, Automatic Speech Recognition and Understanding, ASRU '01. IEEE ).*
Bangalore et al., "Computing Consensus Translation from Multiple Machine Translation Systems", 2001, Automatic Speech Recognition and Understanding, ASRU '01. IEEE ).*
Callison-Burch et al., "Creating Speech and Language Data With Amazon's Mechanical Turk ", Jun. 2010, Asso. for Computational Lingustics, pp. 1-12.*
Bangalore et al., "Computing consensus translation from multiple machine translation systems",Automatic Speech Recognition and Understanding, 2001. ASRU'01. IEEE Workshop on. IEEE, 2001.*

(Continued)

*Primary Examiner* — Pierre-Louis Desir
*Assistant Examiner* — Seong Ah A Shin
(74) *Attorney, Agent, or Firm* — Jones Robb, PLLC (57) ABSTRACT

A method, a system, and a computer program product for translating a document are disclosed. A document in a source language is received and text snippets are extracted from the same. The text snippets are sent to a first set of remote workers for translation and a second set of remote workers for validation. The words in the validated text snippets are assigned a probability score. The words with the highest probability score are combined to generate the translated document.

19 Claims, 6 Drawing Sheets

(56) References Cited

OTHER PUBLICATIONS

Callison-Burch et al., "Creating speech and language data with Amazon's Mechanical Turk", Proceedings of the NAACL HLT 2010 Workshop on Creating Speech and Language Data with Amazon's Mechanical Turk. Association for Computational Linguistics, 2010.*

Yu-An Sun, Shourya Roy, Greg D. Little. Beyond Independent Agreement: A Tournament Selection Approach for Quality Assurance of Human Computation Tasks. In the 2011 AAAI Workshop on Human Computation.

Chris Callison-Burch. 2009. Fast, Cheap, and Creative: Evaluating Translation Quality Using Amazon's Mechanical Turk. In Proceedings of the 2009 Conference on Empirical Methods in Natural Language Processing: vol. 1-vol. 1.

Vamshi Ambati and Stephan Vogel. 2010. Can Crowds Build Parallel Corpora for Machine Translation Systems? In Proceedings of the NAACL HLT 2010 Workshop on Creating Speech and Language Data with Amazon's Mechanical Turk.

Omar Zaidan and Chris Callison-Burch. 2011. Crowdsourcing Translation: Professional Quality From Nonprofessionals. In Proceedings of the NAACL HLT 2010 Workshop on Creating Speech and Language Data with Amazon's Mechanical Turk.

S. Bangalore, G. Bodel, and G. Riccardi. 2001. Computing Consensus Translation from Multiple Machine Translation Systems. In 2001 Automatic Speech Recognition and Understanding (ASRU) Workshop, Madonna di Campiglio, Trento, Italy, December.

* cited by examiner

METHOD FOR TRANSLATING DOCUMENTS USING CROWDSOURCING AND LATTICE-BASED STRING ALIGNMENT TECHNIQUE

COPYRIGHT NOTICE

A portion of the disclosure of this patent document contains material that is subject to copyright protection. The copyright owner has no objection to facsimile reproduction by anyone of the patent document or the patent disclosure as it appears in the Patent and Trademark Office patent file or records but otherwise reserves all copyright rights whatsoever.

TECHNICAL FIELD

The presently disclosed embodiments are directed to document translation. More particularly, the presently disclosed embodiments are directed to a technique for document translation using crowdsourcing and lattice-based string alignment.

BACKGROUND

Language translation is usually performed by linguists and language experts. However, the cost incurred for translation services performed by experts is very high and generally prohibitive. Lately, crowdsourcing has emerged as a favorable option for getting translation services at a reduced cost. However, the primary problem associated with crowdsourcing a translation task is checking the validity of the translation. This is especially a problem due to a very large number of crowdworkers available on any known crowdsourcing platform. The process of verification of translations performed by crowdworkers is time consuming and cost intensive.

In light of the above problems, a more robust technique for verifying translations performed by crowdworkers is required.

SUMMARY

According to aspects illustrated herein, there is provided a method, a system, and a computer program product for translating a document. The method comprises the steps of identifying text snippets in a document in source language. The text snippets are sent to a first set of remote workers for translation. Multiple translations of the text snippets are received from the first set of remote workers. The variations in the translated text snippets are paired and these pairs of variations of the same text snippets are sent to a second set of remote workers for validation. A probability score is assigned to the words of the text snippet on the basis of the validation and the words with the highest probability scores are joined to generate a final translated document.

According to aspects illustrated herein, there is provided a computer implemented method, a system, and a computer program product for translating a document. The system comprises a transceiver module for receiving a document in a source language. The system further comprises a data extraction module which is configured for splitting the document in to text snippets. The system comprises a task manager which further comprises a job creation module. The job creation module is configured for creating a translation and a validation task. Further, the system comprises a scoring engine configured for assigning a probability score to words in the validated text snippets.

According to aspects illustrated herein, there is provided a computer implemented method and a computer program product for translating a document. The computer program product includes program instruction means for identifying text snippets in a document in a source language. Program instruction means are included for sending the text snippets to a first set of remote workers for translation. The computer program product further includes program instruction means for pairing the translated text snippets. Further, pairs of the translated text snippets are sent to a second set of remote workers for validation. The computer program product further includes program instruction means for calculating a probability score for each word of the validated text snippets. Further, the computer program product includes program instruction means for joining the words with the highest probability score to generate a final translated document.

BRIEF DESCRIPTION OF DRAWINGS

The accompanying drawings, which are incorporated in, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples, one element may be designed as multiple elements or that multiple elements may be designed as one element. In some examples, an element shown as an internal component of another element may be implemented as an external component and vice versa. Furthermore, elements may not be drawn to scale.

Various embodiments will hereinafter be described in accordance with the appended drawings provided to illustrate and not to limit the scope in any manner, wherein like designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed description given herein with respect to the figures is just for explanatory purposes as the method and the system extend beyond the described embodiments. For example, those skilled in the art will appreciate that, in light of the teachings presented, multiple alternate and suitable approaches can be realized, depending on the needs of a particular application, to implement the functionality of any detail described herein, beyond the particular implementation choices in the following embodiments described and shown.

Definition of Terms: Terms not specifically defined herein should be given the meanings that would be given to them by one of skill in the art in light of the disclosure and the context. As used in the present specification and claims, however, unless specified to the contrary, the following terms have the meaning indicated.

A "customer" refers to an entity which seeks the conversion of a document, sentence, or segments from sentences from a source language to a target language.

A "job" or a "task" refers to the work that a client wishes to get completed.

"Machine Translation" refers to use of software to translate text from one language to another.

"Crowdsourcing" refers to a technique of outsourcing work to remote workers. In an embodiment, various crowdsourcing platforms such as Amazon Mechanical Turk™, CrowdFlower™, etc., can be used to publish tasks which can be completed by remote workers registered on the crowdsourcing platform.

A "text snippet" refers to a sentence, a phrase, or any logical combination of words.

A "lattice" refers to an algebraic structure. In an embodiment, the lattice describes the combinatorial space of the possible translations of an input text snippet.

"Lattice-based string alignment" refers to a technique that aligns multiple translations of an input text snippet by building a lattice. While the alignment between translations is computed, the lattice is progressively built. In the end of the process, the lattice representing the translation space is obtained.

A "probability score" refers to a score assigned to a translation of a word on the basis of its frequency of occurrence among all translations received for that word (or the text snippet).

Crowdsourcing for language translation services has proliferated in the recent years. Crowdsourcing of a task helps in reducing cost and turn-around time. However, the output received from crowdworkers is noisy and needs a lot of correction before it can be used. Given the volume of translation tasks, manually verifying the correctness of a translation provided by crowdworkers is not feasible. Various embodiments of a method and a system for translating documents using crowdsourcing and leveraging lattice-based string alignment will be explained with the help of the accompanying description.

Figure 1:
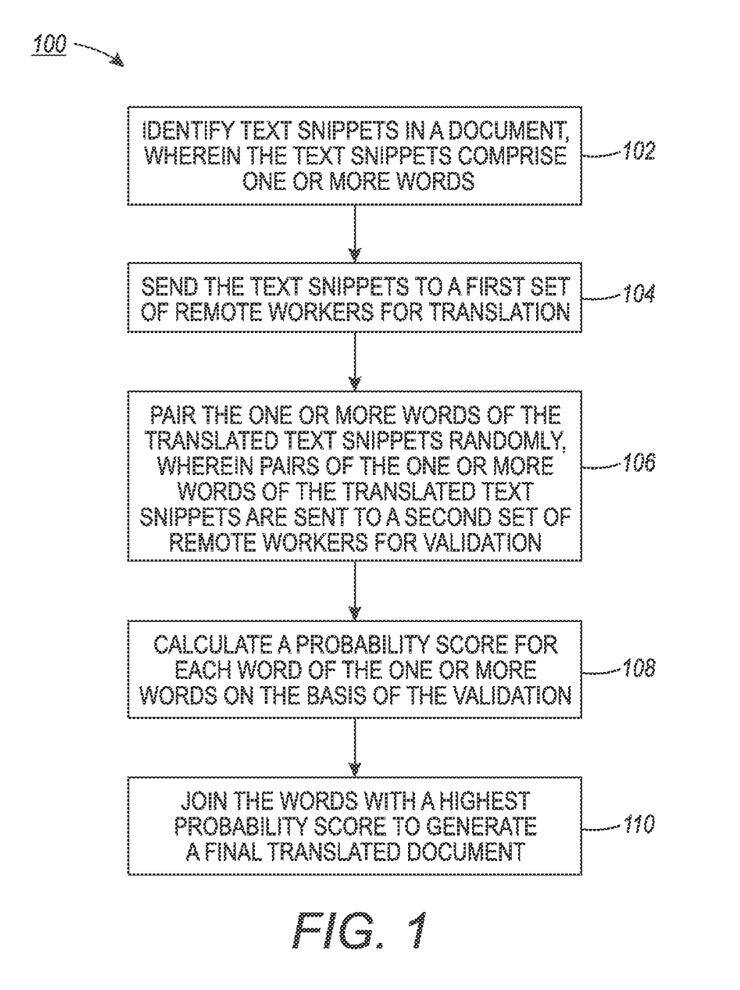
FIG. 1 is a flowchart illustrating a method for translating a document, in accordance with an embodiment.

FIG. 1 is a flowchart illustrating a method for translating a document, in accordance with an embodiment. At step 102, text snippets in a document are identified. The text snippets, in an embodiment, comprise one or more words. It will be apparent to a person having ordinary skill in the art that the text snippets can refer to one or more of a sentence, a phrase, or any logical combination of words. At step 104, the text snippets are sent to a first set of remote workers for translation. In an embodiment, the first set of remote workers are the crowdworkers registered on any known crowdsourcing platform. It will be apparent to a person having ordinary skill in the art that any known crowdsourcing platform can be used to obtain translation services without departing from the scope of the disclosed embodiment. For example, in an embodiment, Amazon's Mechanical Turk™ can be used. In another embodiment, CrowdFlower™ can be used.

At step 106, the translated text snippets received from the first set of remote workers are paired in a random fashion. Further, the pairs of translated text snippets are sent to a second set of remote workers for validation. At step 108, a probability score is assigned to each of the validated text snippets through a lattice-based string alignment algorithm. At step 110, the words with the highest probability score are joined to form sentences. These translated sentences are combined to generate the translated document. The detailed working of the disclosed embodiment will now be explained in more detail in conjunction with the explanation for FIG. 2.

Figure 2A:
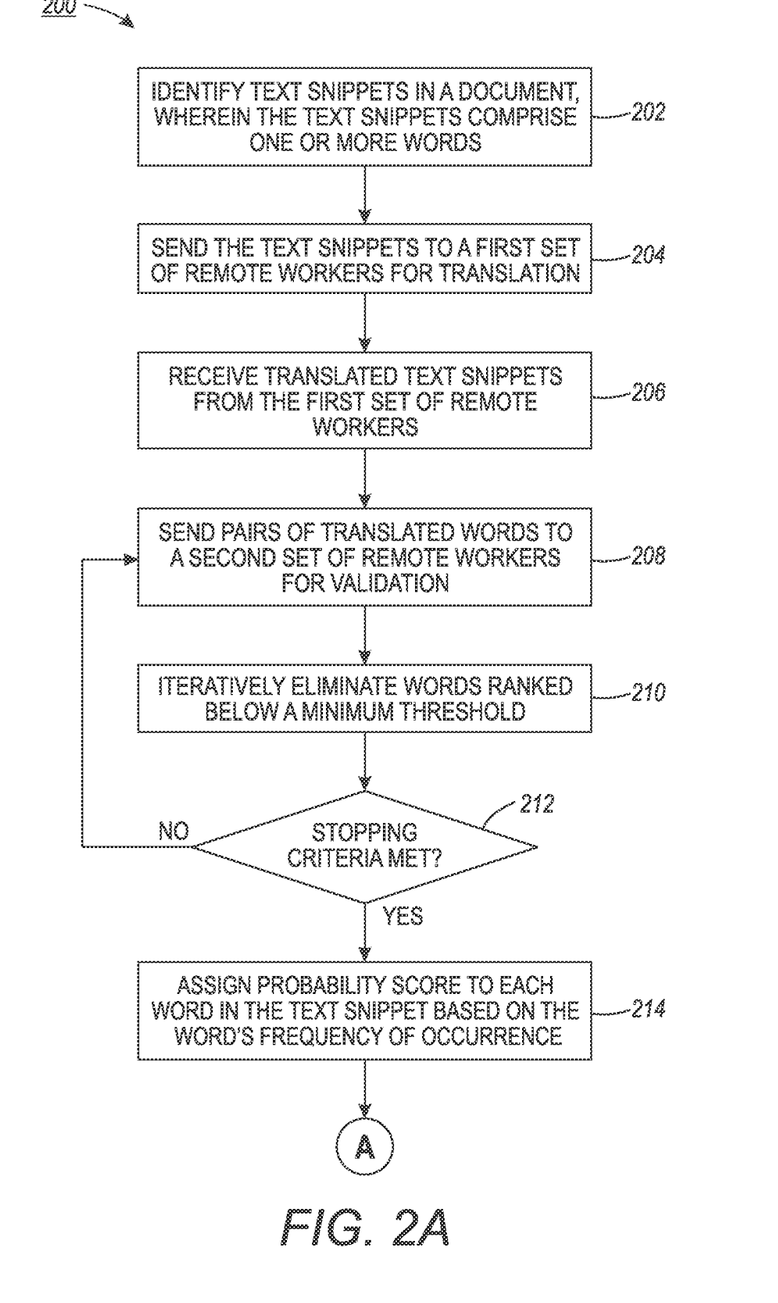
FIGS. 2a and 2b is a flowchart illustrating a detailed method of translating a document, in accordance with an embodiment.
Figure 2B:
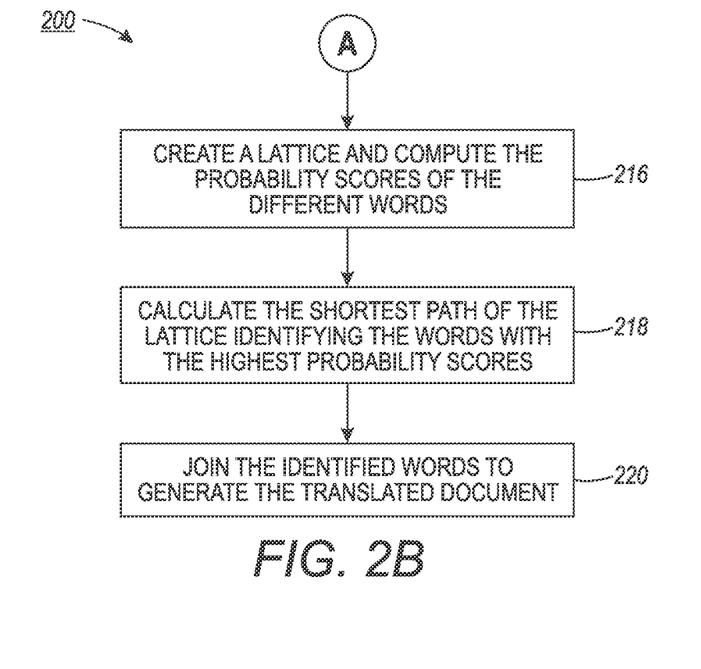

FIGS. 2a and 2b are flowcharts illustrating a detailed method of translating a document, in accordance with an embodiment. A document in a source language is received. At step 202, text snippets in the document are identified. The text snippets comprise one or more words. It will be apparent to a person having ordinary skill in the art that the text snippets can refer to complete sentences, phrases, and/or any logical combination of words. In an embodiment, the text snippets are identified on the basis of a pre-defined technique. In an embodiment, any known pre-defined technique can be used to identifying text snippets in the document. For example, in an embodiment, text snippets can be identified by locating various punctuation marks in the document. For example, the location of a full-stop signifies the completion of a sentence. A comma can signify the presence of a phrase. In another embodiment, a maximum entropy classifier can be used for identifying text snippets in the document. It will be apparent to a person having ordinary skill in the art that any known technique for identifying text snippets in the document can be used without departing from the scope of the disclosed embodiments.

At step 204, the identified text snippets are sent to a first set of remote workers for translation. It will be apparent to a person having ordinary skill in the art that any known techniques can be used for creating the crowd tasks for text snippet translation. In an embodiment, the crowd task (also referred to as translation task) for text snippet translation can be posted on any known crowdsourcing platform such as Amazon's Mechanical Turk™ or CrowdFlower™. Various crowd workers (hereinafter referred to as remote workers) are registered on the crowdsourcing platform. The remote workers can view the translation task and opt to complete it in return for a fee. The text snippets are sent to a first set of remote workers along with instructions for completing the task. The instructions can comprise one or more of the target language in which the text snippets are to be translated, time for translation, etc.

At step 206, the translated text snippets are received from the first set of remote workers. At step 208, the translated text snippets are paired and sent to a second set of remote workers for validation. It will be apparent to a person having ordinary skill in the art that the translated text snippets received from the first set of remote workers will contain a lot of incorrect translations. This generally occurs due to the indifference of the remote workers since typically the remuneration for translating a text snippet is small. In an embodiment, the translated text snippets are paired so as to obtain the n-best translations from all the translations received. It will be apparent to a person having ordinary skill in the art that while the translation of an entire sentence provided by one of the first set of remote workers may be wrong, there is a high possibility that some of the words within the sentences may be correctly translated. In an embodiment, the variation in the translation of each word in one translated text snippet are randomly paired and sent to a second set of remote workers for validation at step 208.

In an embodiment, the random pairing of the translated text snippets implies that any known algorithm can be used to pair the translated text snippets. In another embodiment, an administrator of the translation system can manually pair the translated text snippets prior to validation. In an embodiment, a validation task is created for the second set of remote workers in which the second set of remote workers are used to choose the best pair of translations among the given translations. It will be apparent to a person having ordinary skill in the art that asking the second set of remote workers to select the best translation from the given groups of translated text snippets help in pruning the overall data set thereby eliminating completely erroneous translations.

In an embodiment, the second set of remote workers are asked to choose the best translation of the text snippet in a group. Through this process, the translated text snippets can be ranked (in order of the preference shown by the second set of remote workers). At step 210, the translations which receive the lowest rank from the second set of remote workers are discarded. The administrator of the system can define a pre-defined minimum threshold below which a translation is discarded. The pre-defined minimum threshold indicates the number of responses received from the second set of remote workers indicating the correctness of the translation. It will be apparent to a person having ordinary skill in the art that the iterative process of discarding least ranked translations and retaining the n-best translations leads to a more precise translated data set with much less noise in comparison to the translated text snippets received from the first set of remote workers. The process of removal of least ranked translations can be stopped on the basis of pre-defined rules. At step 212, it is checked if the stopping criteria for stopping the iterative process of removal of translations is met. The stopping criteria can be decided by the administrator of the system. Various stopping criteria can be employed for terminating the process of translation removal. For example, in an embodiment, cost can be a consideration for deciding when the validation task has to be stopped. At step 212, if the stopping criteria is met then the process moves to step 214. Alternatively, the process returns to 210 and the validation, hence the pruning of the data set, continues.

At step 214, once the data set has been sufficiently pruned and bad translations have been removed by the second set of remote workers, a probability score is assigned to each word in the translated and validated text snippets. It will be apparent to a person having ordinary skill in the art that for one text snippet in the source language, multiple translations in the target language have been collected. These multiple translations need to be verified further for accuracy and the best one has to be chosen. The process of assigning the probability score will now be discussed in more detail in conjunction with the explanation for FIG. 3.

Figure 3:
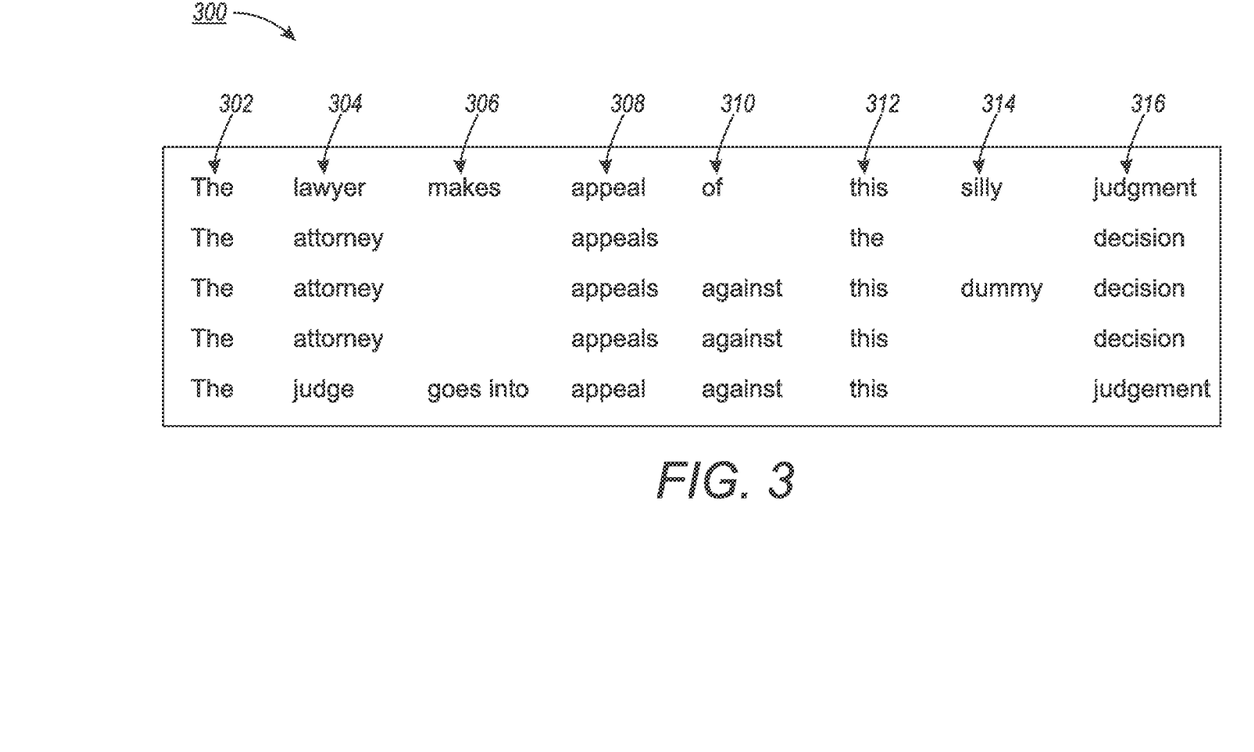
FIG. 3 is a snapshot illustrating multiple translations of a text snippet, in accordance with an embodiment.

FIG. 3 is a snapshot illustrating multiple translations of a text snippet, in accordance with an embodiment. Words 302, 304, 306, 308, 310, 312, 314, and 316 are the translations of the individual words of the validated translations of the text snippet. In an embodiment, the source language of the text snippet is 'Hindi' and the target language in which the translation has to be performed is 'English.' It will be apparent to a person having ordinary skill in the art that sentences contained in snapshot 300 are obtained post the translation performed by the first set of remote workers and the validation performed by the second set of remote workers. Further, the text snippets illustrated in snapshot 300 have been provided only as examples and multiple translations of text snippets in various languages are possible.

Snapshot 300 provides a list of validated translations for a text snippet in a source language. In snapshot 300, each word of the text snippet has one or more translation, as received from the remote workers. It will be apparent to a person having ordinary skill in the art that in the validated translated text snippet, while none of the translation is entirely correct, individual words of different translated text snippets are correct. The individual words are assigned a probability score at least partly on the basis of their frequency of occurrence in the validated text snippets. The probability score is assigned using a lattice-based string alignment technique which will be discussed in more detail in conjunction with the explanation for FIG. 4.

Snapshot 300 illustrated the variants in the validated translations of the text snippets. Each variation is assigned a probability score in accordance with its frequency of occurrence. In snapshot 300, it can be seen that there are no variants of the word 302. That is, all validated translations of the text snippet have the same word in the place of word 302. Hence, the word 302 is assigned a probability score of '1.'

For word 304, it can be seen in snapshot 300 that the following words occur: 'lawyer,' 'attorney,' and 'judge.' In the translations, the word 'attorney' appears three times (out of a total of five validated translated words). Hence, the word 'attorney' is assigned a probability score of 0.6 (that is 3 out of 5). Subsequently, the words 'lawyer' and 'judge' are assigned a probability score of 0.2 each.

For word 306, remote workers of the first and second set of remote workers have returned two translations and four blanks (that is, no translation). Hence, for word 306, a null (or no occurrence) has the maximum frequency of occurrence (3 out of 5) and is consecutively assigned a probability score of 0.6. The other two words, subsequently, are assigned probability scores of 0.2 each.

In an embodiment, the n-best translations, as validated by the second set of remote workers, are considered for assigning the probability scores. It will be apparent to a person having ordinary skill in the art that any known technique can be used to arrange the translated text snippets in a way that the translations of the same word in the text snippet are closest to each other. In an embodiment, a lattice-based string alignment technique (Bangalore et. al.) is used to align the n-best translations such that translations of the same word in the text snippet are aligned close to each other. It will be apparent to a person having ordinary skill in the art that aligning variants in the translation of the same word together leads to ease in the identification of the frequency of occurrence of a particular variation.

Following the above process, each variant in translation for each word in validated translated text snippets is assigned a probability score. These translation variants are then used to create the lattice structure shown in snapshot 400 and the shortest path is calculated to obtain the final translation. Referring to FIG. 2B, the lattice is created at step 216. The lattice will now be explained in more detail in conjunction with the explanation for FIG. 4.

Figure 4:
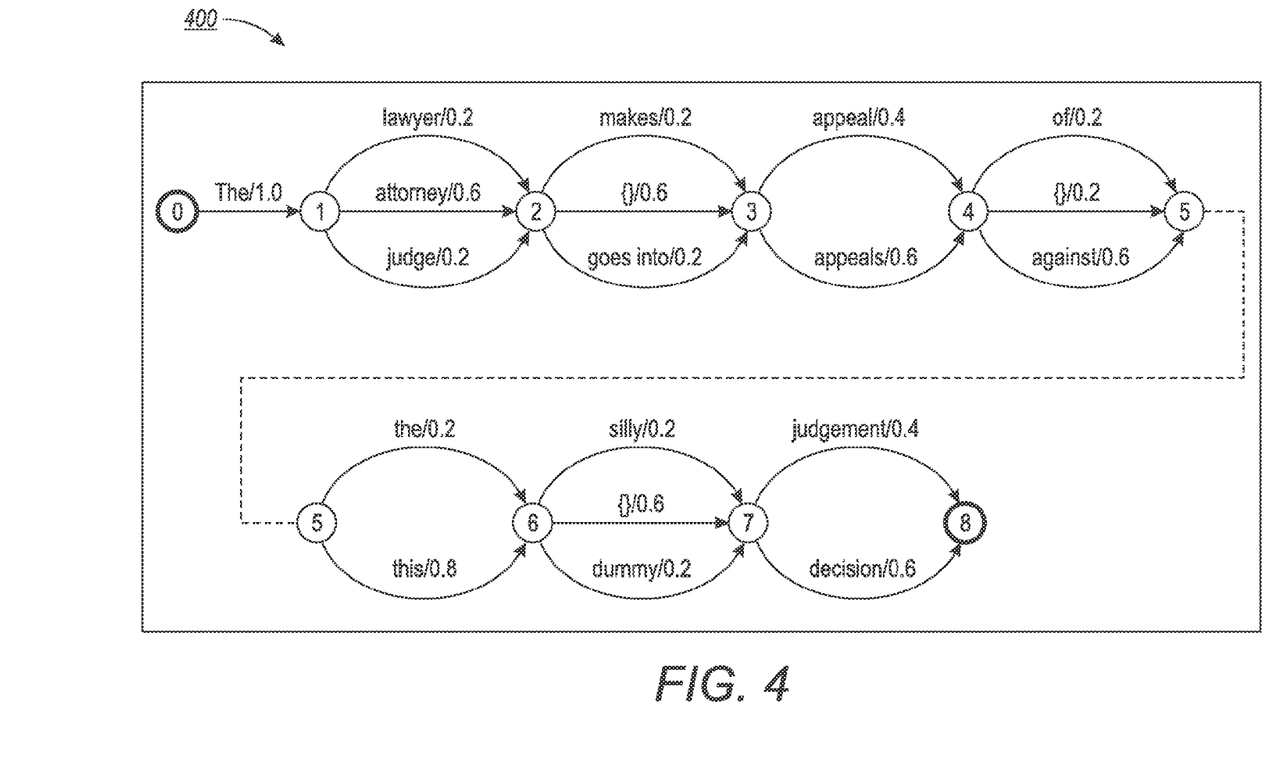
FIG. 4 is a snapshot illustrating the lattice-based string alignment technique, in accordance with an embodiment.

FIG. 4 is a snapshot illustrating the lattice-based string alignment technique, in accordance with an embodiment. The probability scores assigned to the words on the basis of their frequency of occurrence is used to create the lattice. As can be seen from snapshot 400, the variants of the words in the translations of the text snippets represent an individual path in the lattice. The probability scores assigned to the words are also included in the lattice. In an embodiment, any known technique can be used for creating the lattice of snapshot 400. In another embodiment, a lattice-based string alignment technique (Bangalore et al) is used to create the lattice illustrated in snapshot 400. The process of creating the lattice using the lattice-based string alignment technique is known in the art and hence will not be discussed in detail.

In the lattice of snapshot 400, the shortest path in the lattice is identified at step 218 at least partly on the basis of weights assigned to each path of the lattice. It will be apparent to a person having ordinary skill in the art that in snapshot 400, that the weights assigned to each path of the lattice are directly proportional to the probability score of that word.

The shortest path of the lattice is represented by the path which has the maximum weight and hence the words with the highest probability score. At step 220, the shortest path is used to identify the words with the highest probability score, which are then joined to create the final translated text snippet. Subsequently, all final translations of the text snippets are combined to generate the translated document. It will be apparent to a person having ordinary skill in the art that the above disclosed embodiments of identifying variants of word translations using lattice-based string alignment technique is an automated process and requires minimal manual intervention. Further, the step of identifying the shortest path in the lattice is also an automated process and any known technique for identifying the shortest path of a lattice can be used without departing from the scope of the disclosed embodiments.

Figure 5:
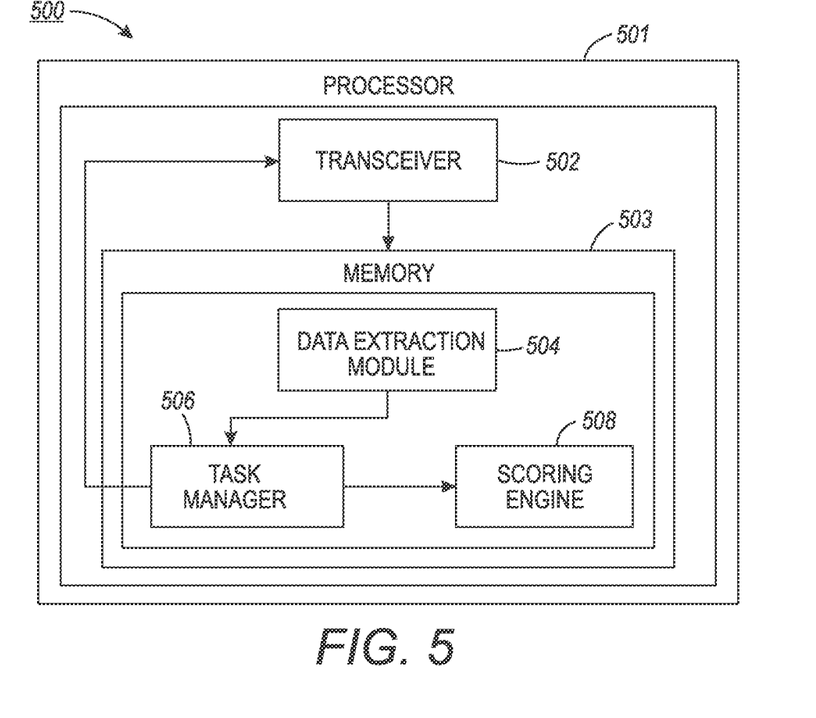
FIG. 5 illustrates a system for translating a document, in accordance with an embodiment.

FIG. 5 illustrates a system for translating a document, in accordance with an embodiment. The system 500 comprises a processor 501 and a memory 503 coupled to processor 501. The system 500 further comprises a transceiver 502, a memory 503, a data extraction module 504, a task manager 506, and a scoring engine 508.

The transceiver 502 is configured for receiving a document in a source language. In an embodiment, the document in the source language is received from a customer who wishes to get a document translated. In another embodiment, the document in the source language can be provided by the administrator of the system for the purpose of creating a parallel corpora of translated text. The customer or the administrator, at the time of sending the document in the source language, also specify the target language to which the translation is desired.

The transceiver 502 sends the document to the data extraction module 504. Data extraction module 504 is configured for splitting the document in to text snippets. The process of identifying text snippets in the document has already been discussed in detail in conjunction with the explanation for FIG. 2. The text snippets are sent to the task manager 506, which is configured for creating tasks which are out sourced to remote workers. Task manager 506 further comprises a job creation module. The functionality of the job creation module will now be explained in conjunction with the explanation of FIG. 6.

Figure 6:
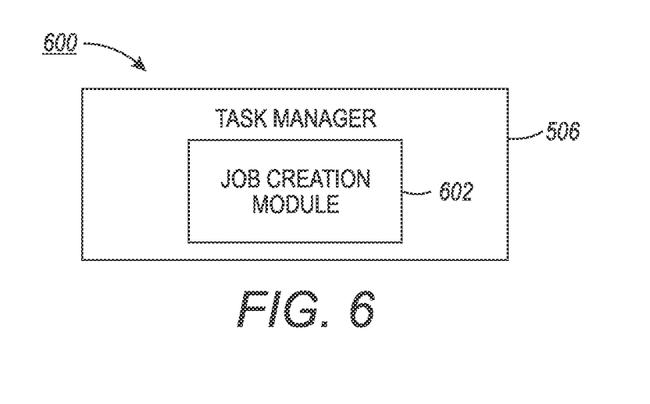
FIG. 6 illustrates the component of the task manager, in accordance with an embodiment.

FIG. 6 illustrates the component of the task manager, in accordance with an embodiment. The task manager 506 comprises a job creation module 602. Job creation module 602 is configured for creating crowd tasks for the remote workers. In an embodiment, the text snippets received from data extraction module 504 are sent to the job creation module 602. The job creation module creates a translation task for the first set of remote workers and publishes the same on a crowdsourcing platform. The translation task can specify the target language, time for completing the task, etc. In an embodiment, any known technique can be used for automatically creating the task without departing from the scope of the disclosed embodiments. The text snippets are sent to the first set of remote workers for translation and the responses of the first set of remote workers are received by transceiver 502. Transceiver 502 subsequently sends the responses to job creation module 602. Further, job creation module 602 creates a validation task for the second set of remote workers by randomly pairing the translated text snippets. The detailed process of creating the translation and validation tasks and their respective output have already been discussed in the explanation for FIGS. 2-4 and hence will not be described in detail here.

The responses received from the second set of remote workers are then sent to the scoring engine 508. In an embodiment, the scoring engine employs lattice-based string alignment technique to align multiple translations of the same word and assigns probability scores to the variations in translations. The probability scores are subsequently used to generate a lattice and the shortest path in the lattice is calculated in order to identify the best translation of the text snippet. The detailed process of creating the lattice and calculating the shortest path have already been discussed in the explanation for FIGS. 2-4 and hence will not be described in detail here.

The disclosed methods and systems, as described in the ongoing description or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, etc. The storage device may also be other similar means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through input device, accessible to the system through an I/O interface.

The computer system executes a set of instructions that are stored in one or more storage elements, in order to process input data. The storage elements may also hold data or other information as desired. The storage element may be in the form of an information source or a physical memory element present in the processing machine.

The programmable or computer readable instructions may include various commands that instruct the processing machine to perform specific tasks, such as, the steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to 'C', 'C++', 'Visual C++' and 'Visual Basic'. Further, the software may be in the form of a collection of separate programs, a program module with a larger program or a portion of a program module, as in the disclosure. The software may also include modular programming in the form of object-oriented programming. The processing of input data by the processing machine may be in response to user commands, results of previous processing or a request made by another processing machine. The disclosure can also be implemented in various operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, with the product capable of implementing the above methods and systems, or the numerous possible variations thereof.

The method, system, and computer program product, as described above, have numerous advantages. Some of these advantages may include, but are not limited to, reducing translation cost and turn-around time by crowdsourcing the translation task to remote workers. Further, the disclosed embodiments enable a cost efficient technique of pruning the translations and eliminating incorrect translations. The automated method also enables the selection of the best translation from a set of n-best translations and helps mitigate the typical problems associated with crowdsourcing of translation tasks.

It will be appreciated by a person skilled in the art that the system, modules, and sub-modules have been illustrated and explained to serve as examples and should not be considered limiting in any manner. It will be appreciated that the variants of the above disclosed system elements, or modules and other features and functions, or alternatives thereof, may be combined to create many other different systems or applications.

Those skilled in the art will appreciate that any of the foregoing steps and/or system modules may be suitably replaced, reordered, or removed, and additional steps and/or system modules may be inserted, depending on the needs of a particular application, and that the systems of the foregoing embodiments may be implemented using a wide variety of suitable processes and system modules and is not limited to any particular computer hardware, software, middleware, firmware, microcode, etc.

Various embodiments of the method, system, and computer program product for translating a document using crowdsourcing and lattice-based string alignment technique have been disclosed. It should be apparent, however, to those skilled in the art that many more modifications besides those already described are possible without departing from the inventive concepts herein. The embodiments, therefore, are not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The claims can encompass embodiments for hardware, software, or a combination thereof.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for translating a document, the method comprising:
    receiving, using a transceiver in communication with a processor and memory, a document in a source language, wherein the transceiver transmits the document to a data extraction module;
    identifying, by the data extraction module in communication with the processor and the memory, text snippets in the document, wherein the text snippets comprise one or more words;
    publishing, by a task manager in communication with the processor and the memory, tasks related to the text snippets on a crowdsourcing platform associated with a first set of remote workers;
    receiving, by the task manager, multiple translations of each of the text snippets from the first set of remote workers;
    pairing, by the task manager, translations of the one or more words of each of the text snippets from the received multiple translations to form a group of translations for each of the text snippets, wherein the translations are paired randomly such that variations in translations for each word of each text snippet received from the first set of remote workers are randomly paired to form the group of translations, and wherein the group of translations for each of the text snippets is sent to a second set of remote workers for review;
    ranking, by a scoring engine in communication with the processor and the memory, the translations of each of the text snippets based on the review;
    removing, by the scoring engine, translations that comprise a ranking below a pre-defined minimum threshold to form a selection of translations;
    calculating, by the scoring engine, a probability score for each word of the one or more words for the selection based on the ranking; and
    joining, by the scoring engine, the words with a highest probability score to generate a final translated document.

2. The method of claim 1, wherein the probability score is calculated based on at least a frequency of occurrence of each word of the one or more words of each translation in the set of translations.

3. The method of claim 1, further comprising generating, by the scoring engine, a lattice based on the probability score for the one or more words of each translation in the set of translations.

4. The method of claim 3, further comprising calculating, by the scoring engine, a shortest path in the lattice based on at least a weight assigned to each word of the one or more words.

5. The method of claim 1, further comprising identifying, by the data extraction module, the text snippets based on a predefined technique.

6. The method of claim 1, further comprising creating, by the task manager, a translation task for the first set of remote workers.

7. The method of claim 1, further comprising creating, by the task manager, a validation task for the second set of remote workers.

8. The method of claim 1, wherein
    the second set of remote workers select translations from the group of translations, and
    the ranking of the translations of each of the text snippets is based on at least a frequency of occurrence of each word of the one or more words in the selections from the second set of remote workers.

9. The method of claim 8, wherein the probability score is calculated based on at least a frequency of occurrence of each word of the one or more words in the selections from the second set of remote workers.

10. A system for document translation, the system comprising:
    a transceiver in communication with a processor and memory, wherein the transceiver is configured to:
        receive a document in a source language, wherein the transceiver transmits the document to a data extraction module;

the data extraction module in communication with the processor and the memory, wherein the data extraction module is configured to:
  split the document into text snippets;
  transmit the text snippets to a task manager;
the task manager in communication with the processor and the memory, wherein the task manager is configured to:
  publish tasks related to the text snippets on a crowdsourcing platform associated with a first set of remote workers;
  distribute the text snippets for translation to the first set of workers;
  pair translations of one or more words of each of the text snippets from received multiple translations to form a group of translations for each of the text snippets, wherein the translations are paired randomly such that variations in translations for each word of each text snippet received from the first set of remote workers are randomly paired to form the group of translations;
  distribute the formed group of for review by a second set of workers;
a scoring engine in communication with the processor and the memory, wherein the scoring engine is configured to:
  rank the translations of each of the text snippets based on the review;
  remove translations that comprise a ranking below a pre-defined minimum threshold to form a selection of translations; and
  calculate a probability score for each word of the one or more words for the selection based on the ranking; and
  join the words with a highest probability score to generate a final translated document.

11. The system of claim 10, wherein the probability score is calculated based on a shortest path search technique to identify words with a highest probability score in the selected text snippets.

12. The system of claim 10, wherein the task manager is operable to collect responses from the first set of workers and the second set of workers.

13. The system of claim 10, wherein the task manager is further operable to group each word of the one or more words of the translations of each of the text snippets provided by the first set of workers.

14. A non-transitory computer-readable storage medium having stored thereon, a computer program having at least one code section, the at least one code section being executable by a computer comprising a processor and memory, wherein execution of the at least on code section causes the computer to perform steps comprising:
  receiving, using a transceiver in communication with the processor and memory, a document in a source language, wherein the transceiver transmits the document to a data extraction module;
  identifying, by the data extraction module in communication with the processor and the memory, text snippets in the document, wherein the text snippets comprise one or more words;
  publishing, by a task manager in communication with the processor and the memory, tasks related to the text snippets on a crowdsourcing platform associated with a first set of remote workers;
  sending the text snippets to a first set of remote workers for translation;
  receiving, by the task manager, multiple translations of the text snippets from the first set of remote workers;
  pairing, by the task manager, translations of the one or more words of each of the text snippets from the received multiple translations to form a group of translations for each of the text snippets, wherein the translations are paired randomly such that variations in translations for each word of each text snippet received from the first set of remote workers are randomly paired to form the group of translations, and wherein the group of translations for each of the text snippets is sent to a second set of remote workers for review;
  ranking, by a scoring engine in communication with the processor and memory, the translations of each of the text snippets based on the review;
  removing, by the scoring engine, translations that comprise a ranking below a pre-defined minimum threshold to form a selection of translations;
  calculating, by the scoring engine, a probability score for each word of the one or more words for the selection based on the ranking; and
  joining, by the scoring engine, the words with a highest probability score to generate a final translated document.

15. The computer-readable storage medium of claim 14, wherein the at least one code section is further executable by the computer for generating, by the scoring engine, a lattice based on the probability score for the one or more words of each translation in set of translations.

16. The computer-readable storage medium of claim 15, wherein the at least one code section is further executable by the computer for calculating, by the scoring engine, a shortest path in the lattice based on at least a weight assigned to each word of the one or more words.

17. The computer-readable storage medium of claim 14, wherein the at least one code section is further executable by the computer for identifying, by the data extraction module, the text snippets based on a predefined technique.

18. The computer-readable storage medium of claim 14, wherein the at least one code section is further executable by the computer for creating, by the task manager, a translation task for the first set of remote workers.

19. The computer-readable storage medium of claim 14, wherein the at least one code section is further executable by the computer for creating, by the task manager, a validation task for the second set of remote workers.

* * * * *